(12) United States Patent
Breuer et al.

(10) Patent No.: US 6,261,346 B1
(45) Date of Patent: Jul. 17, 2001

(54) METHOD FOR PROTECTING METAL SURFACES AGAINST CORROSION IN LIQUID OR GASEOUS MEDIA

(75) Inventors: Wolfgang Breuer, Korschenbroich; Robert Schuetz, Toenisvorst; Guenther Uphues, Monheim; Claus-Peter Herold, Mettmann, all of (DE); Rafael Pi, Granollers (ES)

(73) Assignee: Cognis Deutschland GmbH, Duesseldorf (DE)

( * ) Notice: Subject to any disclaimer, the term of this patent is extended or adjusted under 35 U.S.C. 154(b) by 0 days.

(21) Appl. No.: 09/319,144

(22) PCT Filed: Nov. 19, 1997

(86) PCT No.: PCT/EP97/06451

§ 371 Date: Jul. 29, 1999

§ 102(e) Date: Jul. 29, 1999

(87) PCT Pub. No.: WO98/23792

PCT Pub. Date: Jun. 4, 1998

(30) Foreign Application Priority Data

Nov. 28, 1996 (DE) .............................................. 196 49 285

(51) Int. Cl.[7] .............................. C23F 11/14; E21B 41/02
(52) U.S. Cl. .................................... 106/14.15; 106/14.05; 106/14.42; 106/14.44; 252/390; 252/391; 252/392; 252/394; 422/7; 422/9; 422/12; 422/13; 422/16
(58) Field of Search .............................. 106/14.05, 14.15, 106/14.42, 14.44; 252/390, 391, 392, 394; 422/7, 9, 12, 13, 16

(56) References Cited

U.S. PATENT DOCUMENTS

| | | | |
|---|---|---|---|
| 2,659,693 | 11/1953 | Lytle | 252/8.55 |
| 2,745,809 | 5/1956 | Cardwell et al. | 252/8.55 |

(List continued on next page.)

FOREIGN PATENT DOCUMENTS

| | | |
|---|---|---|
| 42 03 489 | 8/1993 | (DE) . |
| 195 03 277 | 5/1996 | (DE) . |

(List continued on next page.)

OTHER PUBLICATIONS

Chemicals in the Oil Industry, (1991) pp. 21–22 (no month).
Corrosion Inhibition, vol. 11, (1994) pp. 104–112 (no month).
Werkstoffe und Korrosion, vol. 40, (1989) pp. 629–634 (no month).
Proceedings of 8th European Symposium on Corrosion Inhibitors, N.10, pp. 1213–1227 (1995)(no month).
Hauswirtschaft und Wissenschaft, (1994) pp. 70–75 (no month).
Chemosphere, vol. 30, No. 6, (1995) pp. 1067–1083 (no month).
Tenside Surf. Det., vol. 28, (1991) pp. 460–468 (no month).

* cited by examiner

Primary Examiner—Anthony Green
(74) Attorney, Agent, or Firm—John E. Drach; Glenn E. J. Murphy; Aaron R. Ettelman

(57) ABSTRACT

A process useful for protecting metal surfaces against corrosion in is presented involving: (a) forming a corrosion inhibitor having a compound corresponding to formula (I):

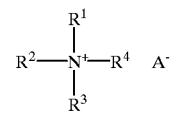

where $R^1$, $R^2$ and $R^3$ independently of one another represent an alkyl or hydroxyalkyl group containing 1 to 4 carbon atoms, an aryl or alkylaryl group or a group corresponding to formula (II):

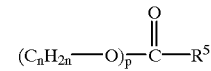

$A^-$ is an anion, n is the number 2 or 3, p is a number of 1 to 3 and $R^5$ is an alkyl or alkenyl group containing 7 to 23 carbon atoms and 0, 1, 2 or 3 double bonds, and $R^4$ is a group corresponding to formula (II) or (III):

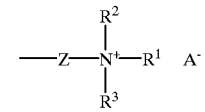

where $R^1$, $R^2$ and $R^3$ are as defined above and Z is a group $-(CH_2)_m-$ or a group corresponding to formula (IV):

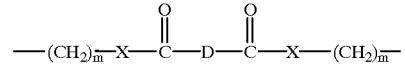

m is an integer of 1 to 6, X is a group NH or an oxygen atom and D is a dimer fatty acid residue containing on average 36 to 54 carbon atoms; (b) combining the corrosion inhibitor with liquid aqueous, liquid non-aqueous or gaseous media; and (c) contacting the corrosion inhibitor with metal. The corrosion inhibitor used in the is biodegradable and shows low aquatic toxicity.

16 Claims, No Drawings

U.S. PATENT DOCUMENTS

| | | | | |
|---|---|---|---|---|
| 4,238,350 | * | 12/1980 | Larsen et al. | 252/392 |
| 4,270,001 | | 5/1981 | Redmore et al. | 564/186 |
| 4,299,982 | | 11/1981 | Redmore et al. | 564/156 |
| 4,673,436 | * | 6/1987 | Haslegrave et al. | 106/14.13 |
| 4,719,083 | * | 1/1988 | Baker et al. | 422/15 |
| 4,814,108 | * | 3/1989 | Geke et al. | 252/545 |
| 4,997,912 | | 3/1991 | Wirtz et al. | 530/232 |
| 5,232,910 | | 8/1993 | Mueller et al. | 507/138 |
| 5,252,554 | | 10/1993 | Mueller et al. | 507/138 |
| 5,403,822 | | 4/1995 | Mueller et al. | 507/138 |
| 5,627,144 | | 5/1997 | Urfer et al. | 507/211 |

FOREIGN PATENT DOCUMENTS

| | | |
|---|---|---|
| 0 239 910 | 10/1987 | (EP) . |
| 0 249 164 | 12/1987 | (EP) . |
| 0 293 953 | 12/1988 | (EP) . |
| 0 293 955 | 12/1988 | (EP) . |
| 0 320 769 | 6/1989 | (EP) . |
| 0 374 671 | 6/1990 | (EP) . |
| 0 374 672 | 6/1990 | (EP) . |
| 0 386 636 | 9/1990 | (EP) . |
| 0 446 616 | 9/1991 | (EP) . |
| 0 651 074 | 5/1995 | (EP) . |
| 1 207 616 | 10/1970 | (GB) . |
| WO94/06899 | 3/1994 | (WO) . |

METHOD FOR PROTECTING METAL SURFACES AGAINST CORROSION IN LIQUID OR GASEOUS MEDIA

CROSS-REFERENCE TO RELATED APPLICATIONS

This application is a 35 U.S.C. §371 national stage application based on International Patent Application No. EP97/06451, filed Nov. 19, 1997.

BACKGROUND OF THE INVENTION

The corrosion of metals in liquid or gaseous media is an age-old problem. In the field of geological exploration in particular, the metal surfaces of the equipment used have to be protected against corrosion, for example under the effect of the mildly acidic or deaerated saline aqueous solutions which are used in the production and processing of petroleum and natural gas. Petroleum and natural gas and the water accompanying them contain corrosive constituents, for example $CO_2$ or $H_2S$ and salts, which lead to serious corrosion of metal surfaces. In addition, the working fluids, for example drilling muds, used in this field also contribute towards corrosion.

Accordingly, so-called corrosion inhibitors are used to provide protection against corrosion, being added to the liquids or gases which come into contact with the metal surfaces. The corrosion inhibitors either form a film on the metal surface or reduce the corrosion process by physico-chemical reactions on the metal surface (cf. P. H. Ogden, Chemicals in the Oil Industry, The Royal Society of Chemistry, 1991, pages 21–22 and O. Lahodny-Šarc, Corrosion Inhibition in Oil and Gas Drilling and Production Operations, Eur. Fed. Corros., Publ. 1994, 11, pages 104–112).

Various substances, normally containing nitrogen, have already been proposed as corrosion inhibitors (O. Lahodny-Šarc, pages 112–113). Mitzlaff et al. (Werkstoff und Korrosion, 40, 629–634 (1989)) describe quaternary ammonium compounds as corrosion inhibitors for the production of petroleum and natural gas. Phillips et al. (Proceedings of the 8th European Symposium on Corrosion Inhibitors, Suppl. N. 10, 1995, 1213–1227) describe certain betaines, for example cocoamidopropyl compounds, for the same purpose. EP 320 769 A2 discloses ethoxylated quaternized ammonium compounds specifically for use in the w/o emulsions encountered in the production and processing of petroleum.

More recently, corrosion inhibitors have also had to satisfy more stringent requirements in regard to their biodegradability and aquatic toxicity. EP 651 074 describes N-ethoxyimidazolines substituted in the 2-position which not only have a favorable corrosion-inhibiting effect, they also show low aquatic toxicity ($EC_{50}$ in *Skeletonema costatum* <1 ppm).

Since it is precisely the chemicals used in the production of petroleum and natural gas which are having to meet increasingly more stringent environmental compatibility requirements, there is still a need to protect metal surfaces exposed to corrosive liquid or gaseous media against corrosion without using substances which have only limited environmental compatibility.

It has now been found that certain quaternized ammonium compounds which contain at least one ester group in the molecule have a favorable corrosion-inhibiting effect, are readily biodegradable and show low aquatic toxicity.

SUMMARY OF THE INVENTION

The present invention relates to processes for protecting metal surfaces against corrosion in liquid aqueous or non-aqueous or gaseous media and to the use of certain quatenized ammonium compounds as corrosion inhibitors.

Accordingly, the present invention relates to a process for protecting metal surfaces against corrosion in liquid aqueous or non-aqueous or gaseous media, characterized in that compounds corresponding to formula (I):

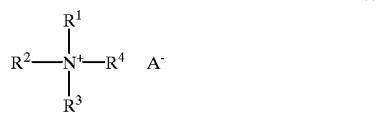

(I)

in which $R^1$, $R^2$ and $R^3$ independently of one another represent an alkyl or hydroxyalkyl group containing 1 to 4 carbon atoms, an aryl or alkylaryl group or a group corresponding to formula (II):

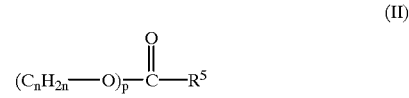

(II)

$A^-$ is an anion, n is the number 2 or 3, p is a number of 1 to 3 and $R^5$ is an alkyl or alkenyl group containing 7 to 23 carbon atoms and 0, 1, 2 or 3 double bonds, and $R^4$ is a group corresponding to formula (II) or (III):

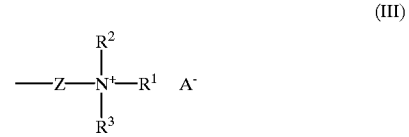

(III)

where $R^1$, $R^2$ and $R^3$ are as defined above and Z is a group $-(CH_2)_m-$ or a group corresponding to formula (IV):

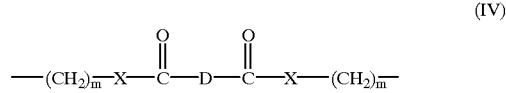

(IV)

and m is an integer of 1 to 6, X is a group NH or an oxygen atom and D is a dimer fatty acid residue containing on average 36 to 54 carbon atoms, are added to the media.

DETAILED DESCRIPTION OF THE INVENTION

The process according to the invention is preferably used to protect metal surfaces, such as occur in the technical equipment used in drilling operations, i.e. for example in pipelines, valves or delivery tubes, against corrosion in liquid aqueous or non-aqueous or gaseous media. The equipment in question is generally made of steel. However, the process according to the invention may also be used to prevent corrosion in other metals, for example aluminium, lead or copper, or alloys containing these metals.

The media to which the metals are exposed may be liquid or gaseous. In geological exploration work, the principal gaseous medium encountered is natural gas. A typical liquid non-aqueous medium is, for example, crude oil. Typical aqueous media preferably contain between 10 and 90% by weight of water. The water encountered in oil and gas production can have salt contents from 0.2% to saturation level and, accordingly, can seriously corrode metal surfaces. However, purely aqueous media can also be encountered, for example in the drilling of drinking water wells. Another medium often encountered are water/oil mixtures or emulsions used, for example, as drilling muds which can contain up to 99% by weight of oil. Besides crude oil, the oil phase can also contain environmentally compatible organic esters, for example of the type described in EP 374 671 A1, EP 374 672 A1 or EP 386 636 A1. In addition, the drilling muds contain suspended clay and other additives which are used to control the properties of the drilling mud.

The compounds corresponding to formula (I) are known and today are mainly used as fabric-softening components or for the antistatic finishing of fabrics. Examples of compounds corresponding to formula (I) where $R^4$ is a group of formula (II) can be found in applicants' WO 94/06899 and DE 42 03 489 A1 which disclose diester amine compounds in fabric softeners. EP 239 910 A1 also describes fabric softeners containing readily biodegradable quaternized mono- and diester amine compounds. In addition, it is known from the literature that ammonium compounds of the type in question are distinguished by ready biodegradability (Hauswirtschaft und Wissenschaft, Vol. 42, No. 2, 1994, pages 72–74 and S. T. Giolano et al., Chemosphere, Vol. 30, No. 6, pages 1067–1083, 1995).

Compounds corresponding to formula (I), in which $R^4$ is a group of formula (III), are described in DE 195 03 277 C1. These compounds are readily biodegradable and, by virtue of their softening and antistatic effect, are used as fiber and textile auxiliaries and in hair cosmetics. However, the corrosion-inhibiting properties of these substances are neither mentioned nor suggested in any of the documents mentioned above.

Compounds corresponding to formula (I) where $R^4$ is a group of formula (II) are preferably used in the process according to the invention. These compounds are technically quaternized mono-, di- or trifatty acid amine ester compounds which can be obtained by known synthesis methods. Compounds containing one and preferably two fatty acid ester groups are normally used. The quatemized compounds may be obtained, for example, by esterification of tertiary mono-, di- or trialkanolamines, preferably triethanolamine or triisopropanolamine, with fatty acid chlorides and subsequent quaternization of the esters formed with methyl chloride, benzyl chloride or dimethyl sulfate. Particulars of the production of these cationic ester amine compounds can be found, for example in EP 293 955 A2 and EP 293 953 A2.

Besides the preferred compounds of formula (I) where $R^4$ is a group corresponding to formula (II), compounds containing two quaternized nitrogen atoms per molecule corresponding to formula (I), where $R^4$ is a group of formula (III), may also be used. Of these compounds, those in which the group Z stands for a dimer fatty acid group of formula (IV) are preferred.

The synthesis of these compounds is carried out, for example, in accordance with the teaching of DE 195 03 277 C1. To this end, tertiary amines corresponding to formula (V):

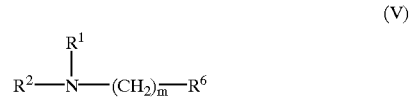

in which $R^6$ is an $NH_2$ or OH group and $R^1$, $R^2$ and m are as defined above, are condensed with dimer fatty acids containing on average 36 to 54 are condensed with dimer fatty acids containing on average 36 to 54 carbon atoms and the dimer fatty acid esters or amides obtained are subsequently quatemized with known alkylating agents, for example dimethyl sulfate or dimethyl carbonate, to form the compounds of formula (I) used in accordance with the invention, in which $R^4$ is a group corresponding to formula (III) and Z is a group corresponding to formula (IV).

In the context of the invention, dimer fatty acids are understood to be oligomeric fatty acids which may be obtained in known manner by thermal or catalytic oligomerization of unsaturated fatty acids, for example oleic acid or erucic acid, or technical fatty acid mixtures with iodine values in the range from 45 to 115. In the course of the dimerization, which is an electrocyclicene reaction, two fatty acids or, in small quantities, even three fatty acids are linked to form an unsaturated, but normally non-aromatic ring system.

In the synthesis of these compounds, N,N-dimethylaminopropyl amine or N,N-dimethylaminopropanol is preferably used as the tertiary amine while oligomerization products of technical oleic acid are used as preferred dimer fatty acids. The molar ratio of amine to dimer fatty acid is preferably adjusted to a value of 1:1.5 to 1:2.2 in accordance with the teaching of DE 195 03 277.

Compounds of formula (I), in which $R^4$ stands for a group corresponding to formula (III), where Z is a methylene group —$(CH_2)_m$—, preferably a polymethylene group containing 6 carbon atoms, may also be used. Of these compounds, those in which both quaternized nitrogen atoms each carry two ester groups of formula (II) are preferably used. These compounds are prepared by conventionally reacting an alkylenediamine, preferably hexamethylenediamine, with ethylene oxide in a first step, then esterifying the reaction product with a carboxylic acid and finally quaternizing the ester with suitable compounds, for example dimethyl sulfate.

The alkyl group $R^5$ corresponding to formula (II) in the compounds of formula (I) used in the process according to the invention is preferably linear and contains between 7 and 23 carbon atoms. Groups containing from 7 to 21 carbon atoms are preferred. The alkyl group may be saturated or unsaturated. Unsaturated alkyl groups may contain 1, 2 or 3 double bonds, but preferably contain only 1 double bond.

A particularly preferred process is one which uses compounds of formula (I) in which the ester groups are obtained by esterification of fatty acid mixtures, preferably palm oil, rapeseed oil or coconut oil fatty acids. Other suitable fatty acids are, for example, caprylic, capric, lauric, myristic, palmitic and stearic acids and unsaturated acids, such as oleic acid, erucic acid, linoleic acid or linolenic acid, behenic acid or mixtures of these compounds. Compounds in which one of the groups $R^1$ to $R^3$ is a hydroxyalkyl group, preferably containing 2 to 4 carbon atoms, and/or an aryl or alkylaryl group, more particularly containing 6 to 12 carbon atoms, preferably a benzyl group, are also preferably used.

Another preferred embodiment of the process according to the invention is characterized by the use of compounds corresponding to formula (I) in which one or more of the substituents R¹, R² or R³ is/are also a group corresponding to formula (II).

The anions A⁻ of the compounds corresponding to formula (I) used in the process according to the invention are determined by the quaternizing agent used in the synthesis, such as methyl chloride, benzyl chloride or dimethyl sulfate. The anions are preferably selected from the group of halides, methosulfate and methophosphate.

The compounds corresponding to formula (I) may be used in the process according to the invention by addition to the medium to be treated in effective quantities. Mixtures of compounds corresponding to formula (I) or mixtures with other known inhibitors, for example N-alkyl betaines, N-alkyl imidazolines, polyalkoxylated amines, amides and imidazolines or phosphoric acid esters, may also be used. The process is preferably carried out by adding the compounds corresponding to formula (I) in such quantities that their concentration, based on the total quantity of medium, is between 5 and 1,000 ppm.

Processes in which the compounds of formula (I) are used in the form of aqueous solutions are preferred. These solutions contain the compounds of formula (I) in quantities of preferably 5 to 50% by weight and, more preferably, 10 to 30% by weight, based on the total weight of the solutions. The solutions may also contain alcohols, preferably $C_{1-6}$ alcohols, such as isopropanol, ethylene glycol or propylene glycol, or mixtures thereof in quantities of 5 to 30% by weight, based on the quantity of the aqueous solutions.

Besides the ingredients already mentioned, the aqueous solutions may also contain other additives, including for example emulsifiers, such as fatty amines or dimer or trimer fatty acids, and $H_2S$ or $O_2$ scavengers, such as sodium thiosulfate or sodium hydrogen sulfite. These additives are added to the solutions in typical quantities, i.e. in quantities of 1 to 10% by weight.

In another preferred embodiment of the process according to the invention, the compounds corresponding to formula (I) are used in the form of a solution in a non-aqueous solvent selected from aliphatic or aromatic hydrocarbons liquid at room temperature, the solutions containing the compounds of formula (I) in quantities of 5 to 50% by weight and preferably in quantities of 10 to 30% by weight.

Suitable hydrocarbons are, for example, spirit, paraffins liquid at room temperature or aromatic hydrocarbons, such as toluene, xylene or diethyl benzene, and mixtures of these compounds.

It has proved to be of advantage to use the non-aqueous solvents in admixture with short-chain $C_{1-8}$ alcohols in the process according to the invention, the ratio by weight of non-aqueous solvent to alcohol being from 1:10 to 10:1 and, more particularly, from 4:1 to 1:4. Suitable alcohols are, for example, ethanol, propanol, isopropanol, 2-ethylhexanol, or glycols, for example ethylene or butylene glycol and mixtures thereof. However, the compounds of formula (I) may also be used in the form of solutions in alcohols. In addition, solutions of the compounds (I) in non-aqueous solvents may contain other suitable additives, for example $H_2S$ or $O_2$ scavengers.

If the process according to the invention is used to protect metals exposed to gaseous media, the compounds of formula (I) in the form of aqueous or non-aqueous solutions are sprayed as an aerosol in the gaseous medium.

The present invention also relates to the use of compounds corresponding to formula (I) as corrosion inhibitors for metals in liquid aqueous or non-aqueous or gaseous media.

The use according to the invention is by no means confined to oil or gas production (for example as an additive to drilling muds or as a corrosion inhibitor for pipelines and other pipes), instead the compounds corresponding to formula (I) are generally suitable for use as corrosion inhibitors for metal surfaces, preferably steel surfaces.

EXAMPLES

Example 1

The corrosion-inhibiting properties were determined by a so-called wheel test. In this coupon test, the erosion caused by the corrosion of inhibited systems is compared with the erosion occurring in non-inhibited systems.

To this end, steel coupons (Mild Steel 1018, sand-blasted) were degreased with acetone and weighed, subsequently immersed in a corrosive medium and stored therein for 72 hours at 60° C. while turning (60 r.p.m.). The corrosive medium used was a mixture of a salt-containing aqueous phase (5% by weight NaCl, 0.5% by weight acetic acid) and spirit (boiling range at normal pressure 145–200° C.), the mixture being saturated with $CO_2$ and $H_2S$. The mixing ratio (v/v) of water to spirit was 50:50.

The inhibiting substances were used in the form of a 30% by weight aqueous solution. The concentration in each case was 30 ppm (based on the quantity of corrosive medium).

The coupons were then washed with an acetone/isopropanol mixture (50:50, v/v), dried and reweighed. The protective effect compared with coupons stored without corrosion control was determined from the difference in weight of the coupons before and after the treatment in the corrosive medium. A weight loss of 0 mg represents a protective effect of 100%.

Table 1 below shows these values for inhibitors 1 to 5 according to the invention and, for comparison, the value of a conventional betaine inhibitor. Inhibitors 1 to 5 according to the invention clearly show a significantly better protective effect.

TABLE 1

| Inhibitor | Protective effect (in %) |
|---|---|
| 1 | 71 |
| 2 | 77 |
| 3 | 89 |
| 4 | 87 |
| 5 | 85 |
| C | 37 |

Composition of the Inhibitors:
1: Methyl-N,N-bis-(coco-oxyethyl)-N-(2-hydroxyethyl) ammonium methosulfate
2: N,N,N-trimethyl-N-(coco-oxyethyl)ammonium methosulfate
3: N,N-dimethyl-N-benzyl-N-(coco-oxyethyl)ammonium chloride
4: N,N,N-trimethyl-N-(palmoxyethyl)ammonium methosulfate
5: N,N-dimethyl-N-benzyl-N-(palmoxyethyl)ammonium chloride
V: N,N-dimethyl-N-(cocoamidopropyl)-N-acetyl betaine

Examples 2

Besides the pure inhibitors, mixtures containing additional additives needed, for example, in the petroleum industry were also investigated. The mixtures in question are ready-to-use formulations for use under typical conditions, for example during drilling or in the production of petroleum or natural gas. The mixtures were subjected to the above-described wheel test in which the corrosive medium was the same mixture as in Example 1, except that the water-to-spirit ratio (v/v) was 10:90 (for the results, see Table 2). The mixtures contained 20% by weight of inhibitor, 10% by weight of isopropanol as co-solvent, 2% by weight of a cocofatty amine reacted with 12 moles of ethylene oxide, 2% by weight of trimer tall oil fatty acid, 2% by weight of sodium thiosulfate as $H_2S$ scavenger and, for the rest, water. The inhibitors used were compounds 3 and 4 mentioned above.

TABLE 2

| Inhibitor | Protective effect (in %) |
|---|---|
| 3 | 89 |
| 4 | 87 |

Example 3

Inhibitors 2 to 5 were dissolved in a solvent mixture of 40% by weight of isopropanol and 60% by weight of aromatic hydrocarbons (Solvesso 150®, a product of Exxon). The solutions each contained 25% by weight of the inhibitor. They were subjected to the above-described wheel test (concentration of the inhibitors 10 ppm, based on the corrosive medium):

TABLE 3

| Inhibitor | Protective effect (in %) |
|---|---|
| 2 | 88 |
| 3 | 89 |
| 4 | 90 |
| 5 | 86 |

Example 4

Corrosion inhibitors 6 and 7 according to the invention were subjected to the wheel test under the conditions of Example 3. The ratio by volume of water to organic phase was 90:10. The organic phase consisted or equal parts by volume of isopropanol and Solvesso® 150.

Inhibitor 6 was prepared by initially reacting 436 g of hexamethylenediamine (3.8 moles) with 995 g of ethylene oxide (22.6 moles) in the absence of a catalyst at 120–130° C./1 bar pressure.

410 g (1.3 moles) of this ethoxylated hexamethylenediamine were esterified with 590 g of stearic acid (2.1 moles) and 1.5 g of phosphinic acid at 170° C./0.4 bar pressure until the acid value of the product had fallen to a value below 5. 795 g of the ester were then mixed with 500 g of isopropyl alcohol and heated to 60° C., after which 213 g (2 moles) of dimethyl sulfate were added for quaternization. The mixture was then heated for 4 hours to 80° C., after which the product was obtained as a light yellow paste.

Inhibitor 7 is a commercially available dimer fatty acid amidoamine (Empol 1014, a product of Henkel KGaA) which has been quaternized with dimethyl sulfate.

The results are set out in Table 4:

TABLE 4

| Inhibitor | Protective effect (in %) |
|---|---|
| 6 | 92 |
| 7 | 93 |

The results of these tests show that even the ready-to-use mixtures retain their favorable protective effect.

What is claimed is:
1. A process for protecting a metal surface against corrosion, the process comprising:
    (a) providing a metal surface to be protected against corrosion;
    (b) providing a compound of the general formula (I):

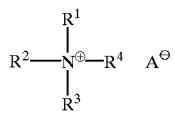

(I)

wherein $R^1$, $R^2$ and $R^3$ each independently represent an alkyl or hydroxyalkyl group having from 1 to 4 carbon atoms, an aryl or alkylaryl group or a group corresponding to the general formula (II):

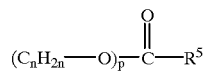

(II)

wherein $A^-$ represents an anion, n is equal to 2 or 3, p is a number from 1 to 3 and $R^5$ represents an alkyl or alkenyl group having from 7 to 23 carbon atoms and up to 3 double bonds, and $R^4$ represents a group corresponding to the general formula (II) or (III):

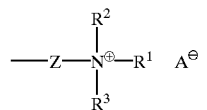

(III)

wherein $R^1$, $R^2$ and $R^3$ are as defined above and Z represents —$(CH_2)_m$— or a group corresponding to the general formula (IV):

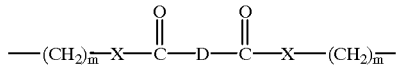

(IV)

wherein m is an integer of from 1 to 6, each X independently represents an —NH— group or an oxygen atom and D represents a dimer fatty acid residue containing an average number of carbon atoms of from 36 to 54; and
    (c) contacting the metal surface with a corrosion-inhibiting effective amount of the compound.
2. The process according to claim 1, wherein $A^-$ represents an anion selected from the group consisting of halides, methosulfate and methophosphate.

3. The process according to claim 1, wherein (c) contacting the metal surface with the corrosion-inhibiting effective amount of the compound comprises: (i) combining the compound with a medium, and (ii) contacting the metal surface with the medium containing the compound; wherein the medium is selected from the group consisting of liquid aqueous media, liquid non-aqueous media, and gaseous media.

4. The process according to claim 3, wherein the compound is combined with the medium in an amount of from 5 to 1000 parts per million parts of the medium.

5. The process according to claim 1, wherein the compound is provided as an aqueous solution.

6. The process according to claim 5, wherein the aqueous solution comprises from 5 to 50% by weight of the compound.

7. The process according to claim 5, wherein the aqueous solution comprises from 10 to 30% by weight of the compound.

8. The process according to claim 5, wherein the aqueous solution further comprises from 5 to 30% by weight of isopropanol, ethylene glycol, propylene glycol or mixtures thereof.

9. The process according to claim 1, wherein the compound is provided as a non-aqueous solution containing one or more hydrocarbons which are liquid at room temperature.

10. The process according to claim 9, wherein the non-aqueous solution comprises from 5 to 50% by weight of the compound.

11. The process according to claim 9, wherein the non-aqueous solution comprises from 10 to 30% by weight of the compound.

12. The process according to claim 9, wherein the non-aqueous solution further comprises a $C_{1-8}$ alcohol.

13. The process according to claim 12, wherein the one or more hydrocarbons and the alcohol are present in a weight ratio of from 1:10 to 10:1.

14. The process according to claim 12, wherein the one or more hydrocarbons and the alcohol are present in a weight ratio of from 1:4 to 4:1.

15. The process according to claim 1, wherein the compound contains an ester group obtained by the esterification of a member selected from the group consisting of palm oil, rapeseed oil, and coconut fatty acids.

16. The process according to claim 3, wherein the compound is provided as an aerosol and is sprayed into a gaseous media prior to contact with the metal surface.

* * * * *